Jan. 16, 1945.    V. C. BELT    2,367,180
CONTINUOUS WIRE TYING BALER
Filed Dec. 13, 1941    8 Sheets-Sheet 1

INVENTOR.
VERNON C. BELT
BY
ATTORNEY.

Jan. 16, 1945. V. C. BELT 2,367,180
CONTINUOUS WIRE TYING BALER
Filed Dec. 13, 1941  8 Sheets-Sheet 2

INVENTOR.
VERNON C. BELT.
BY
ATTORNEY

Jan. 16, 1945.  V. C. BELT  2,367,180
CONTINUOUS WIRE TYING BALER
Filed Dec. 13, 1941  8 Sheets-Sheet 4

INVENTOR.
VERNON C. BELT.
BY
ATTORNEY.

Jan. 16, 1945. V. C. BELT 2,367,180
CONTINUOUS WIRE TYING BALER
Filed Dec. 13, 1941 8 Sheets-Sheet 6

INVENTOR.
VERNON C. BELT.
BY
ATTORNEY.

INVENTOR.
VERNON C. BELT.
BY
ATTORNEY.

Patented Jan. 16, 1945

2,367,180

UNITED STATES PATENT OFFICE 2,367,180

CONTINUOUS WIRE TYING BALER

Vernon C. Belt, West Allis, Wis.

Application December 13, 1941, Serial No. 423,410

13 Claims. (Cl. 100—20)

This invention relates to baling apparatus and has more particular reference to devices that are incorporated therein for tying or securing the bale wire or wires after the bale has been compressed in the pressure or compression chamber.

The tying performed by my apparatus is preferably in the form of a tight compact twist performed at proximate portions of the wire and the free outer ends of the wire at the twist are outwardly projected to diverge from each other, with the result that should there be a tendency due to excess stresses and strains to unwind at least one of the ends will contact the taut wire and arrest further unwinding. The leading or terminal portion of the wire is firmly held in viselike jaws during the sequential steps of the baling or compressing operation. The other portion of the wire is fed about the bale from the wire supply reel proportionate with the gradual increase in size of the bale and after the bale has been completed this part of the wire is automatically severed.

It is the aim of my invention to provide a baling and tying apparatus which accomplishes the function securely tying the bales with wire in an effective and dependable way with said function being accomplished in a manner such that the speed and continuity of the baling operation are not impaired. Also it is an aim of my invention to provide a baling structure that is entirely automatic in its mode of operation and which requires practically no attention or manual intervention during the baling and tying steps. The apparatus is simple, sturdy, will not readily get out of order, and it is economical to manufacture so that the apparatus may be available at price ranges customarily expected for competitive and less satisfactory balers.

One object of the present invention is to simplify the construction and improve the operation of devices of the character mentioned.

Another object is to provide an improved tying unit for baling devices which effectively clamps, twists and shears wire from a continuous supply in timed relation with baling instrumentalities.

Still another object is to provide continuous reels of wire in conjunction with baling instrumentalities for timed cooperation with a threader and tying device to sequentially wire compressed bales of material supplied thereto in a continuity of operation.

A further object is to provide an improved tying member with clamping and shearing expedients to grasp proximate portions of a continuous wire in enveloping relation with a bale that is progressively compressed in timed relation with the rotation thereof.

A still further object is to provide an improved tying unit that embodies a plurality of clamping means for the proximate portions of a continuous wire in conjunction with shearing instrumentality effective in timed relation therewith for forming a twisted wire baling loop around a compressed substance.

Still another object is to provide clamping and shearing instrumentalities within a rotatably mounted housing for timed actuation in conjunction with a continuous wire to produce twisted baling loops in timed relation with progressive baling operations.

Other objects and advantages of this device will be apparent to persons skilled in the art after the nature of the apparatus is understood from the within disclosure. My invention embodies substantially the novel construction, combination and arrangement of the parts that are hereinafter described and illustrated in the drawings and defined in the claims. The apparatus is shown in a practical or typical descriptive embodiment, but this is not to be taken as in anywise limiting the scope of the claims thereto appended.

In the structure which I have invented and which is disclosed herein the straw, hay, or other material to be compressed and baled is fed into the baling chamber through a side thereof rather than through the top and the reciprocable plunger which successively compresses batches of the material is adapted to shear off each charge from the surplus material which is outside the compression chamber.

As a consequence, the bale wires pass vertically around the bale instead of horizontally according to the usual practice. It will be understood that the tying mechanism which I have invented is not in anywise limited to either type of apparatus as the structure herein described and shown is merely a typical form.

Figure 1:
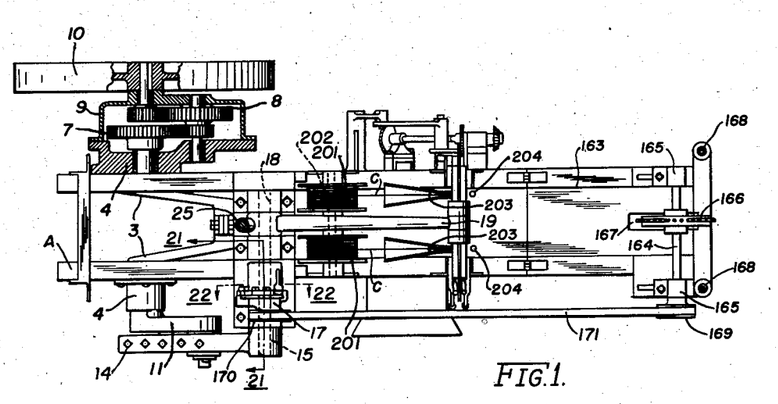
Figure 1 is a top plan of my baling apparatus embodying features of the present invention.
Figure 2:
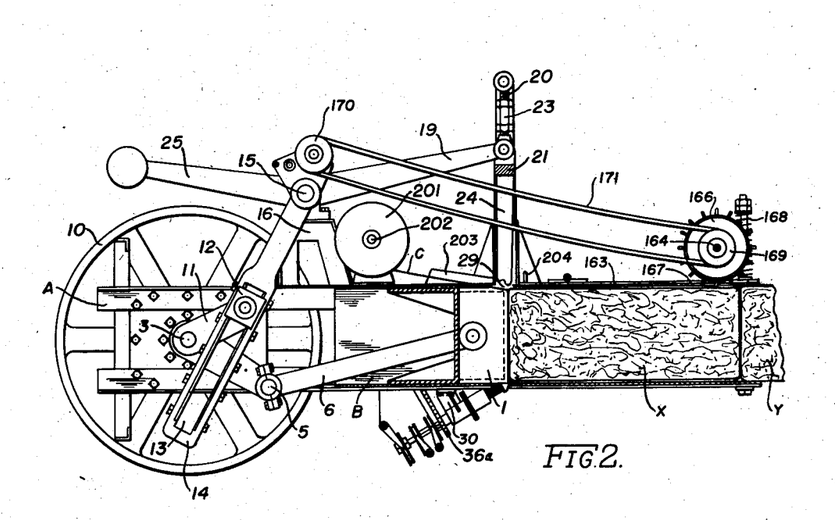
Figure 2 is a vertical elevation of the structure shown in Figure 1 with portions in vertical section to show the plunger and baling chamber.
Figure 3:
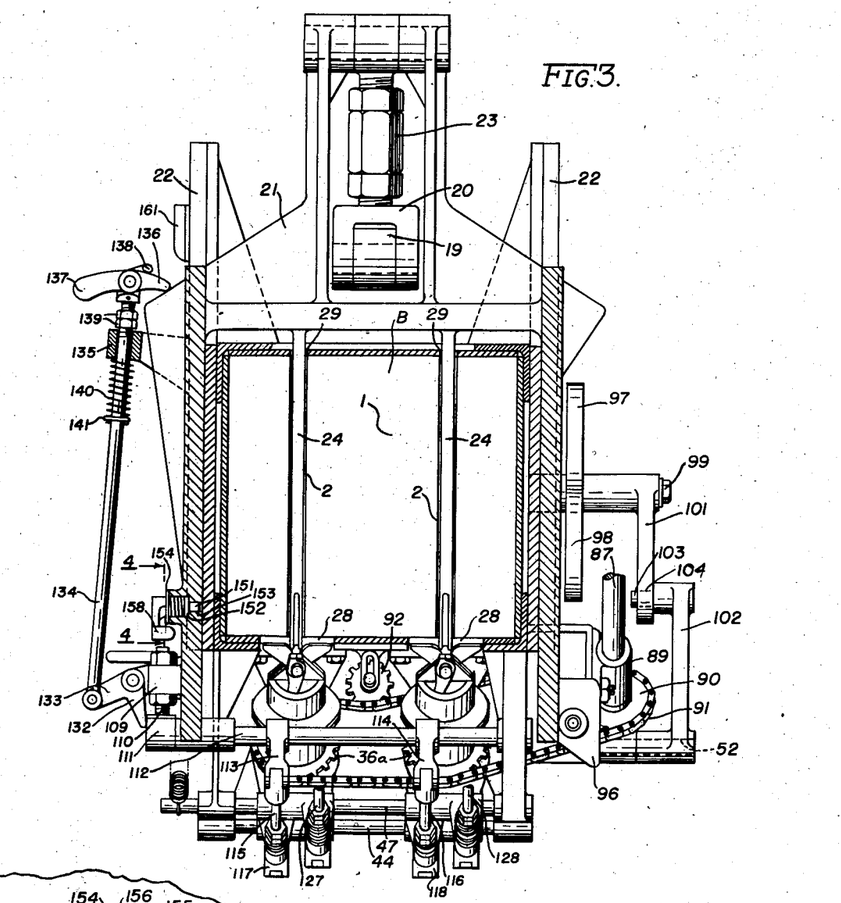
Figure 3 is a transverse vertical section on line 3—3, Figure 5 across the baling chamber showing portions of the tying mechanism.

As will be seen by reference to Figures 1 and 2, the mechanism is mounted in a skeleton or open frame of a substantially rectangular form which is fabricated from strips of angle-metal extending in horizontal and transverse directions and spaced from each other by cross members. This frame as a whole is designated as "A" in the figures of the drawings, and the compression or baling chamber as "B." The rectangular shaped reciprocable plunger 1 which operates in the chamber B is provided with longitudinally extending vertical slots 2 corresponding to the number of wires "C" which are to be tied about the bale. Figure 3 shows two of these vertical slots which are adapted to cooperate with the wire threaders of the tying mechanism. A rotatable crank shaft 3 is mounted in bearings 4 in the supporting frame back of the plunger, and the crank-pin 5 of said shaft is connected to the plunger by the piston rod or connecting rod 6. One end of the crank-shaft extends through its bearing and it is connected to a gear 7 of a gear-train 8 mounted in a suitable housing 9 on the adjacent portion of the frame, which gear-train is driven by a combination pulley and fly-wheel 10 deriving its motion from any suitable source of power. The momentum of this rapidly revolving fly-wheel is sufficient to prevent too much reduction of speed during the period of time the tying operation is taking place.

The other end of the crank-shaft 3 passes through its adjacent bearing and has a crank arm 11 anchored to it that is adapted to operate the tying devices. A rectangular slide block 12, which is rotatably carried by the outer free end of crank arm 11, is adapted for reciprocal movement in a guide slot 13 extending longitudinally in the adjacent portion of an oscillatory arm 14 that is fulcrumed at its upper end upon and is anchored to a short horizontal rock-shaft 15 that has bearings in a bridge 16 on the top of the main supporting frame A of the apparatus. The inner end of this rock-shaft 15 is connected with one of the members of a trip-clutch 17, and the opposing member of said clutch is connected with a second rock-shaft 18 aligned axially with said first shaft 15 and is journaled in bearings upon the bridge 16.

An elongated arm 19 is anchored to rock-shaft 18 intermediate the bearings of the latter and extends in a generally horizontal direction towards the discharge end of the apparatus. When the members of clutch 17 are engaged at the proper time the arm 19 is adapted to be moved up and down coincident with the rocking of the shafts 15 and 18 and the swinging movement of the oscillatory arm 14. The outer end of the arm 19 has pivotal connection with a link 20 that swings pendent from the upper portion of a vertically reciprocable carrier frame 21 that is adapted to move up and down in vertically disposed guides 22 arising from the top of the main frame A in approximately the vertical plane of the inner end of the finished bale in the baling or compression chamber B.

Intermediate its ends the link 20 is formed with a turn-buckle device 23 whereby the length of the link may be adjusted whenever desired, and depending from the carrier 21 are the threaders 24 for the wires C, there being two of these threaders 24 shown herein for convenience to cooperate with two strands of wire C and the vertical slots 2 in the plunger 1. In order to more or less balance the weight of the carrier and its associated elements, a counterweight arm 25 is provided as an extension of the carrier moving arm 19. When the plunger is moving back and forth in the chamber, the arm 14 is given an oscillatory movement, and the relation between the other members is such that as soon as the leading edge of the plunger 1 passes the threaders 24 the latter will begin their downward movement through the slots 2 in the plunger 1 and they will return to their uppermost position out of the plunger 1 by the time the plunger reaches the limit of its return movement.

Figures 10, 11, 12:
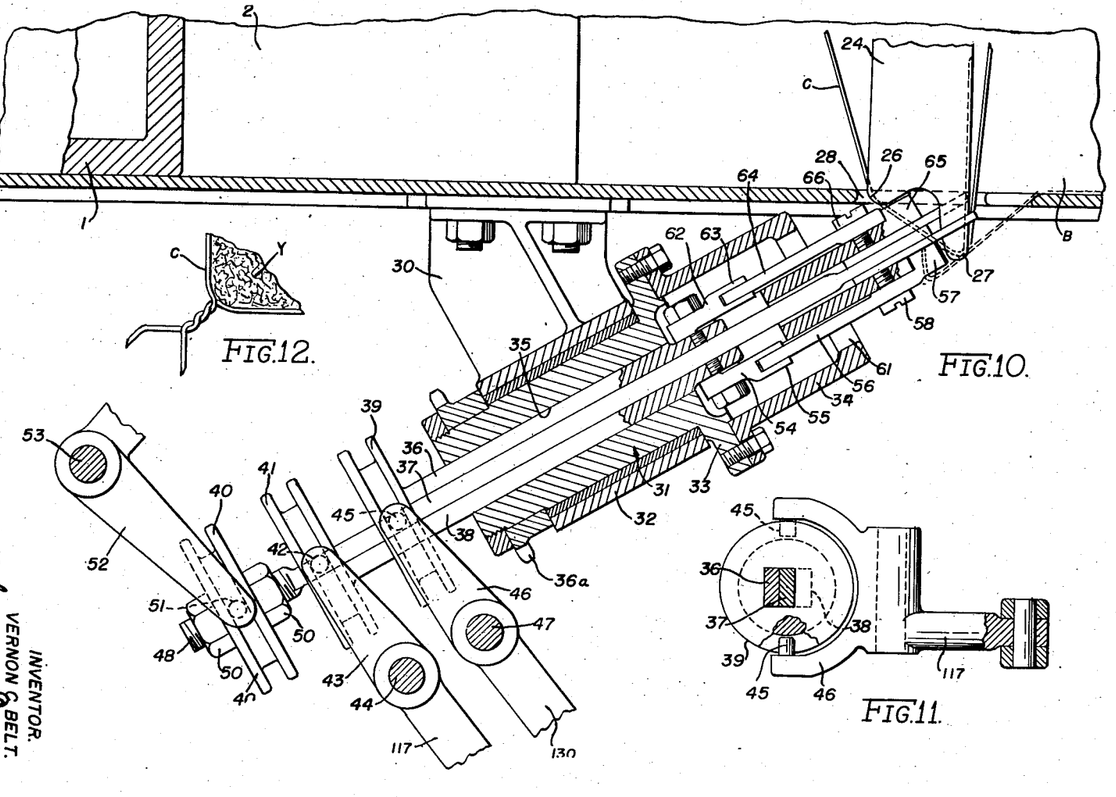
Figure 10 is a view partly in longitudinal section of a tying unit and the adjacent portion of the baling chamber.
Figure 11 is a transverse section on line 11—11 of Figure 6.
Figure 12 is a detail of the tied or twisted ends of the wire.

It will be seen in Figure 10 that the lower end of the threaders 24 are provided with spaced lobes 26 and 27 arranged in stepped relation to each other, the latter being lower than the former, and the bottom edges of these lobes are provided with recesses or grooves to receive and guide the wires substantially as shown in said figure of the drawings. Also it will be noted that the bottom wall of the baling chamber is provided with slots 28 which permit the lobed ends of the threaders 24 to pass out through the bottom where the portion of the wire between the lobes may be engaged by the adjacent elements of the tying mechanism. Slots 29 are provided in the upper wall of the chamber, and the wire "C" which is stretched along these slots is engaged by the threaders when they begin their down movement, and said wires are carried through the plunger and the lower slots 28 for delivery to the tying elements.

One of the tying units is illustrated in detail in Figures 10 to 16 of the drawings, and by reference to Figure 10 it will be noted that the axis of the unit is oblique to the plane of the bottom of the baling chamber "B" and is mounted in a suitable bracket 30 that is anchored to the bottom of the apparatus. The unit comprises a rotatable body 31, having a cylindrical outer surface, mounted in a bearing 32 on the bracket 30 and having an annular flange 33 at its upper end that is alongside the edge of the bearing, and secured to said flange is a hollow extension 34 that is of two-piece formation and provides a portion of the head of the tying unit. The body 31 is provided with a central bore 35 of rectangular cross-section that extends from end to end of said body to receive and accommodate a plurality of bars of flattened rectangular shape in cross section and of such transverse dimensions that the bars will fit the bore 35 and may be moved independently of each other in longitudinal directions in the body and also be rotated with said body when the latter is turned in its bearing by the rotation of a sprocket-wheel 36a that is anchored to the lower end of the body outside the bearing 32.

The bars 36, 37, and 38 are of different lengths and are disposed side-by-side with the bar 37 in the center between the other bars, and the ends of these bars which project different distances out of the body 31 are provided with grooved collars respectively 39, 40, and 41 the collars 39 and 41 having rectangular holes therein through which the bars 37 and 38 may be moved in longitudinal directions. The annular groove of collar 41 on the end of bar 38 is engaged by pins 42 on a control yoke 43 that is fulcrumed on a shaft 44 so that when this yoke is moved the bar 38 will slide in the body 31 along the axis of the latter. The grooved collar 39 on the protruding end of bar 36 is engaged by the pins 45 of a yoke 46 that is fulcrumed on a shaft 47 so that the movement of said yoke will slide the bar 36 in the same manner as bar 38. As shown in Figure 10 the shafts 44 and 47 are disposed alongside of each other and in parallel relation. The center bar 37 passes through the collars 39 and 41 and has a threaded end 48 upon which a grooved collar 49 is secured by nuts 50, and the groove in this collar 49 is engaged by the pins 51 of a yoke 52 on a shaft 53 that is adapted to move the bar in sliding relation through the body 31 in the same manner as the other bars are moved. This arrangement permits all of the bars 36, 37, and 38 to be bodily rotated during the rotation of the body 31 when the latter is driven by its sprocket-wheel 36a.

Figure 13:
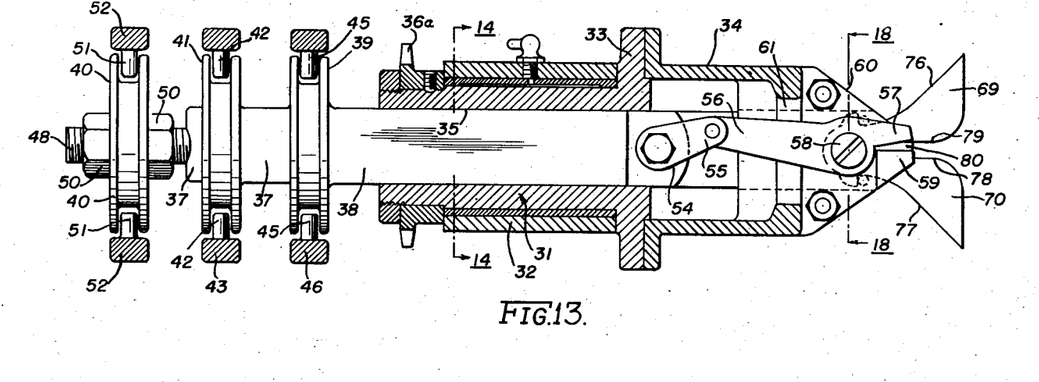
Figure 13 is a view of the parts of the tying unit shown in Figure 10, but in a plane at a right angle thereto.
Figure 14:
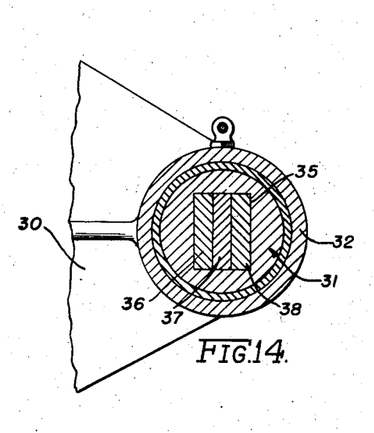
Figure 14 is a vertical transverse section taken on line 14—14 of Figure 13.
Figure 15:
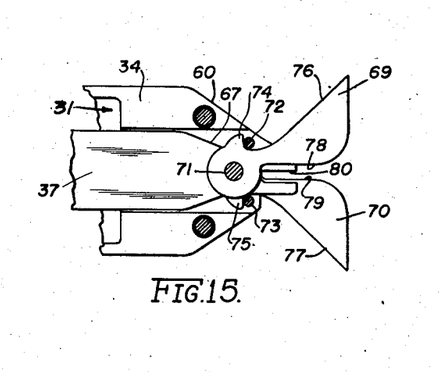
Figure 15 is a detail of the head of tying unit illustrating the assembly of the cutters.
Figure 16:
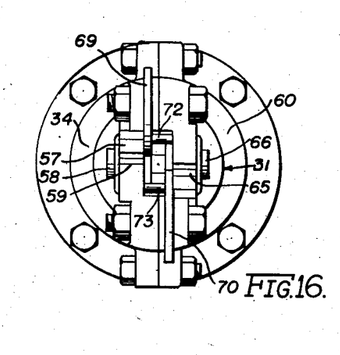
Figure 16 is a view looking at the outer end of the head of the tying unit and cutters.
Figures 17, 18, 19, 20:
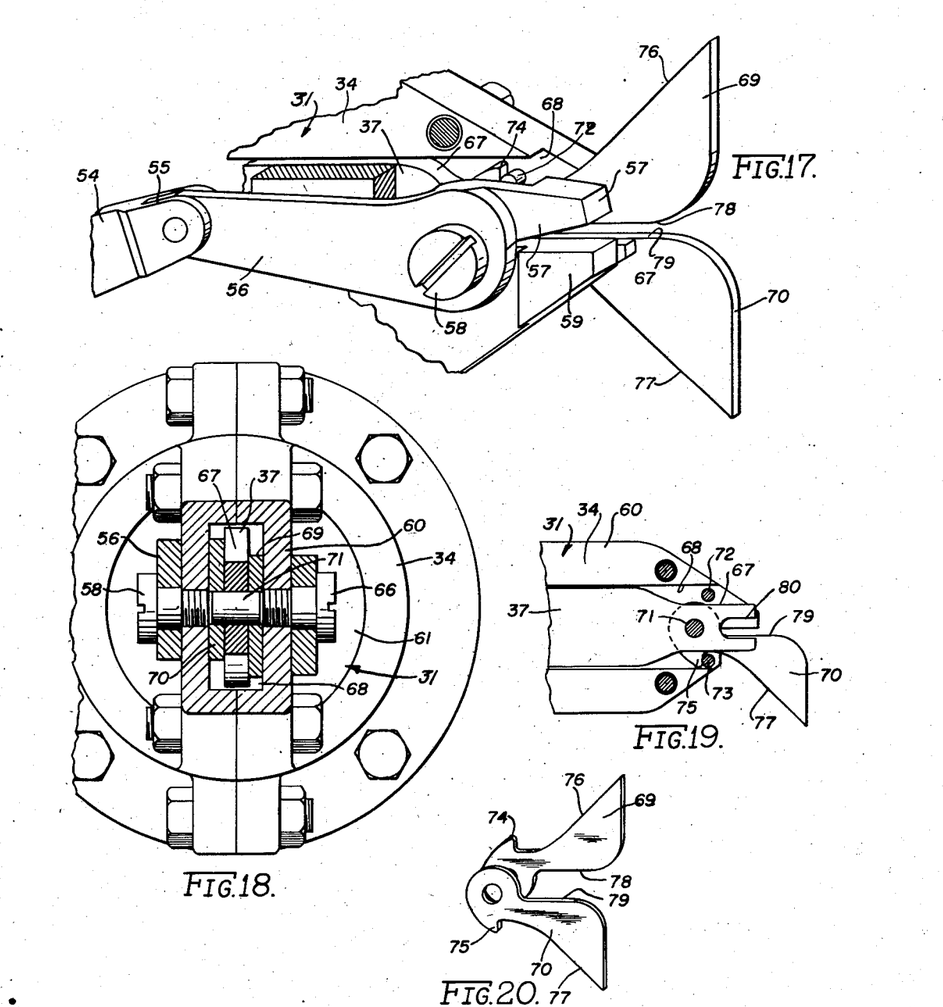
Figure 17 is an enlarged perspective view of a tying or twisting unit and associated cutters.
Figure 18 is a transverse section on line 18—18 of Figure 13 drawn to an enlarged scale and looking in the direction of the arrows.
Figure 19 is a view in side elevation showing portions of tying device and cutter.
Figure 20 is a perspective view of a pair of cutter blades detached from their mounting.

A link 54, having a bifurcated end 55, is pivotally secured to the inner end of bar 38 within the hollow extension 34 of the head portion of the tying unit, and the lever arm 56 of a movable clamping jaw 57 is pivotally connected in the bifurcation while the clamping jaw 57 which extends beyond the fulcrum or pivot screw 58 is disposed in coactive relation above the fixed jaw 59. The outer end of the hollow extension or head 34 has a tapered formation 60 as indicated in Figure 13 and at the base of this taper the head has an opening 61 through which the lever arm 56 extends. The fulcrum or pivot screw 58 enters the adjacent wall of the taper so that the lever arm 56 and the movable jaw 57 are disposed upon the flat outer face of said taper as shown in enlarged detail in Figure 18.

In a manner similar to that just described, the slide-bar 36 is pivotally connected at its end to a link 62 having a bifurcation 63 to be pivotally connected with the lever of a movable clamp jaw 65 that has a co-acting stationary jaw 65' on the head. This movable element of the second clamp is fulcrumed on a pivot screw 66 that enters the side of the flat taper 60 that is opposite the first described clamp. In this manner, the head is provided with two clamps 57—59 and 65—65' that are separated a desired distance apart and are adapted to be separately and independently operated whenever actuated so that the wire between the jaws are securely held against slippage.

The center bar 37 has a reduced end portion 67 that enters a narrow vertically elongated slot 68 and extends between cutters 69 and 70 that have pivotal mounting on said reduced end through the medium of a smooth pin 71 that is slightly shorter than the width of said slot 68 and is held in place by the walls of said slot. Suitable abutments in the form of pins 72 and 73 extend across the slot 68 above and below the reduced end portion 67 of slide bar 37 and the cutters 69 and 70 are provided with lugs 74 and 75 respectively that are adapted to be engaged with the abutment pins 72 and 73 during certain portions of the sliding movement of the bar 37. When said bar is retracted into the head (toward the left in the drawings) the inclined edges 76 and 77 of the cutters will engage the pins causing each of the shearing edges 78 and 79 of said cutters to pass the edge of the stationary jaw adjacent to it. At each retraction of the cutters one of them severs the wire held in the adjacent jaws while in the immediately succeeding retraction the opposite blade performs the shearing operation as the wire to be severed is then clamped in the jaws adjacent to it. The end of the slide bar 37 is provided with a longitudinal recess 80 extending inwardly from its transverse end edge so that said bar, while effectively acting as a spacer to keep the cutters 69 and 70 closely adjacent to their respective cooperating shearing edges, straddles the wire so that it does not interfere with the latter.

The devices for operating the tying units of the apparatus are adapted to be actuated through the medium of the vertically reciprocable carrier frame 21 which is moved up and down in its guides 22 whenever the arm 19 is in active operation. An elongated rack 81 is secured to one of the vertical side members of threader carrier 21 between its guides on one side of the apparatus and a gear 82 on a short shaft 83 meshes with said rack and is adapted to be given a single complete rotation during each up or down movement of the carrier 21. The short shaft 83 is horizontally disposed in a bearing 84 on the side of the apparatus and its end opposite gear 82 has a miter-gear 85 secured to it that meshes with a miter-pinion 86 on the adjacent upper end of an inclined shaft 87 which rotates in spaced bearings 88 and 89 secured to the frame of the apparatus. At its lower end shaft 87 projects beyond its bearing 89 where a sprocket-wheel 90 is mounted in a position to interengage the links of an endless chain 91 that is looped about the sprocket-wheels 36a on the tying units, and there is an adjustable idle sprocket-wheel 92 (Figure 3) that engages the chain intermediate the units to take up any slack in said chain and to assist in maintaining it upon the sprocket-wheels 36a.

Figures 6, 7, 8, 9:
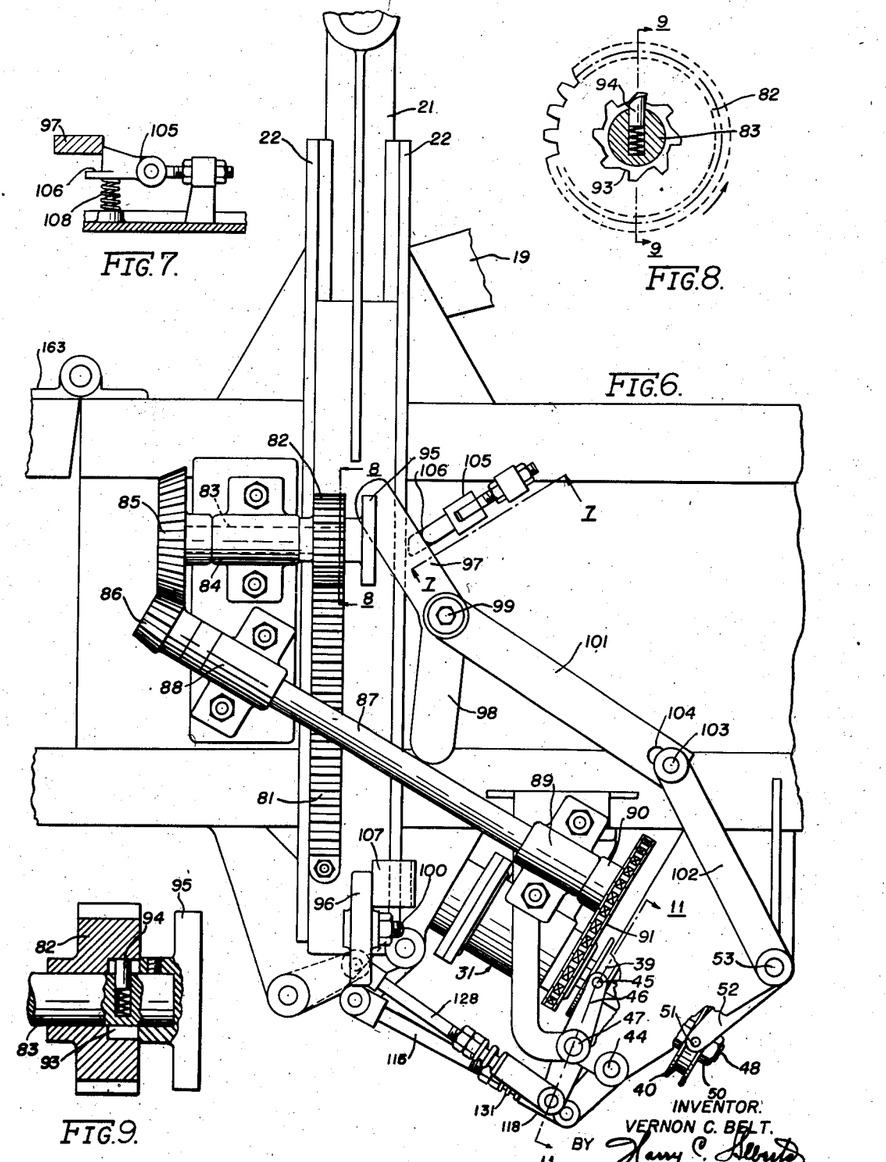
Figure 6 is a vertical side elevation of the mechanism for operating the tying units and cutters on the opposite side of the bale chamber.
Figure 7 is a detail on line 7—7 of Figure 6 of the latch mechanism for holding the cutters in extended position.
Figure 8 is a view on line 8—8 of Figure 6 showing details of a ratchet device and Figure 9 is a section thereof on line 9—9 of Figure 8.

The gear 82 is provided with internal ratchet teeth 93 which are engaged by a spring-pressed pawl 94 so that it will rotate the shaft 83 only when said gear is rotated in the direction of the arrow in Figure 8, and in order to insure that the tying units are in the proper position so as to receive the wire from the threaders in the succeeding downward movement of the threader carrier 21, a setting device is provided in the form of a bar 95 secured to and disposed transversely across the end of gear shaft 83. A cam element 96 projects outwardly from the lower portion of the carrier 21 in vertical alignment with bar 95, and when the carrier is reaching the limit of its upward movement the cam 96 will contact the bar 95 and move it to a vertical position in the event said bar has not already reached such position. The ratio of the gears and sprocket-wheels is such that gear 82 turns one revolution during movement of the carrier in proper direction and the tying units are revolved preferably two and one-half revolutions. This ratio may be readily changed in the event additional twists of the wire are desired to tie the bale.

A vertically disposed bell-crank comprising oblique arms 97 and 98 is pivotally mounted on a shaft 99 projecting horizontally from the side of the baling chamber of the apparatus, said arms being located in the line of movement of a detent 100 that is adjustably mounted upon the side of the cam element 96 which operates the tying unit positioning bar 95, and integral with or secured to the hub of the bell-crank is another arm 101 which inclines downwardly away from said hub in the manner shown in Figure 6. The rock-shaft 53 which moves the yoke 52 to slide cutter bar 37 is adapted to be rocked by the swinging movement of the arm 101 of the bell-crank assembly which has just been described. This is effectively accomplished by means of an arm 102 that is secured at one end to an adjacent portion of the rock-shaft 53 and extends upwardly in an inclined direction therefrom toward the free end of said arm 101 where it is provided with a lateral stud 103 that is entered in an elongated slot 104 in the adjacent end portion of the bell-crank arm 101. The upward movement of the carrier 21 will bring the detent 100 into engagement with the upper arm 97 of the bell-crank causing a rocking of the rock-shafts 99 and 53 in one direction, while during the reverse or downward movement of said carrier the detent will engage the lower arm 98 of said bell-crank to turn the rock-shafts 99 and 53 in a reverse direction.

A catch device 105 of articulated construction (as detailed in Figure 7) is mounted on the side of the baling chamber, said catch having a shouldered part 106 on its spring pressed movable member to engage with the adjacent edge of the bell-crank arm 97 to assist in maintaining the latter in proper inactive position. A trip 107 is secured to the carrier slightly above the detent 100 so that it is in advance thereof during upward movement of the carrier and its inner face will engage the movable catch member to move it away from the bell-crank arm 97 and release it so that the arm will be free to move when it is engaged by the detent. The upward movement of the carrier, which is adapted to release and move the bell-crank in a clockwise direction (Figure 6) causes the cutters 69 and 70 of both units to be drawn into their respective heads, and the reverse or downward movement of the carrier causes the cutters to be moved into their extended positions and the catch has automatically become operative to hold the bell-crank as before described due to the action of the spring 108 which is acting on the movable member of said catch.

The mechanisms for controlling and operating the clamping jaws are located upon the side of the apparatus opposite the devices related to the wire cutters. It will be understood there are two pairs of clamping jaws for each tying unit; that is there is a pair of these jaws upon each side of a cutter as will be seen in Figure 16. The devices now to be described are illustrated in Figures 3 to 6 of the drawings. A bored boss 109 is provided upon the lower end of the carrier 21 and a threaded rod 110 which is locked therein is adapted to engage and move a cam 111 upon the adjacent end of rockshaft 112 that is journaled in bearings at the sides of the apparatus beneath the baling chamber and has laterally disposed arms 113 and 114 secured to it intermediate its bearings. At their free outer ends the arms 113 and 114 are pivotally connected to the adjacent end portions of links 115 and 116 respectively which have their other ends connected to extension arms 117 and 118 on the respective yokes 43 of one of the wire grippers or clamps 57—59. The cam boss is provided with an elongated handle 119 which is adapted to be used during the threading operation, and the cam is maintained in its desired position by a contraction spring 120 that is connected at one end to said handle and has its other end anchored to a fixed part of the apparatus so that it will return the clamping jaws controlled by this cam to their opened position when the cam is released from its latched position.

A second bored block 121 on the lower portion of the carrier has a threaded rod 122 anchored in it similar to the first-described rod 110, but its position is to one side of and below that of the rod 110. Rod 122 engages a cam 123 secured to a transverse shaft 124 and has a downwardly extended handle 125 that is urged in one direction by a contraction spring 126 that has an end secured to it and its other end anchored to a fixed part of the machine. Linkage members 127 and 128 connect arms 129 on shaft 124 with the extensions 130 on the yokes 46 that actuate the movable jaws of the second pair of clamps on the other sides of the cutters of each tying unit. All of the links above-mentioned have compression devices 131 interposed in them which are adapted to maintain the clamping jaws in proper position to tightly clamp the wires regardless of wear or variances in the course of manufacture.

Suitable means are provided for maintaining the clamping jaws in their active positions during the tying and severing the wires, and also for releasing one jaw of each unit after the twisting operation has been completed and preceding the continuation of the travel of the finished bale out of the bale chamber. When the cam 111 is pushed down two jaws (one in each tying unit) are moved into clamping position, and a pivoted latch device 132 is employed to retain the cam in its downward position. An arm 133 projects outwardly from the latch for pivotal connection with a vertically disposed elongated rod 134 that extends upwardly to the top of the baling chamber where it passes through a bearing bracket 135 projecting from the main frame of the apparatus, and at its upper end above the bracket the rod is provided with an inwardly projecting pawl 136 that has a counter-weight 137 outside or beyond its fulcrum to maintain the upper face of said pawl in engagement with a transverse stop 138 which prevents upward movement of the pawl. Adjustable locknuts 139 on the rod 134 above its bearing are adapted to limit the travel of the latch 132 and a compressed spring 140 surrounds rod 134 between the bearing bracket and a transverse stop 141 on said rod. When cam 111 is moved downward the latch 132 will swing across the top of the cam due to the action of the spring 140, thus holding the structure so that the connected jaws in the tying units are in clamping positions.

A similar latch structure, for cooperation with cam 123, is disposed alongside the devices which have been last above described, so that the clamping jaws which are linked to this cam are held in their clamped position. In this second structure the latch 142 has pivotal connection with the vertical rod 143 which is journaled in bearing bracket 144 and has a counterweighted pawl 145 pivoted upon its upper end that is limited by its stop 146. A compressed spring 147 pressing between the bearing and a stop 148 urges the rod downward and adjustable lock nuts 150 on the rod limit its downward movement.

Figure 4:
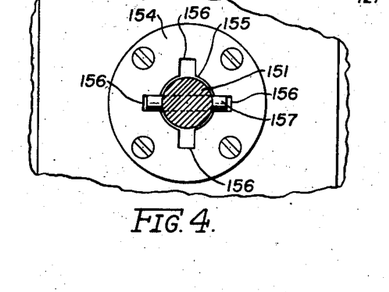
Figure 4 is a sectional view on line 4—4 of Figure 3 showing the release control devices enlarged.

A release control device is mounted on the carrier 21 in a plane intermediate the rods 134 and 143 and above the latch members 132 and 142. This comprises a stud 151 having an annular flange 152 intermediate its ends, said stud and flange fitting into a small hole 153 and a widened portion thereof that is formed in a boss on the side of the carrier body (Figure 3). The outer face of the boss is covered by a disk 154 that has a round central hole 155 and vertical and horizontal radial slots 156. A cross-pin 157 passes diametrically through the stud and is held rigidly therein so that the ends of the pin will fit into two opposite slots as shown in Figure 4 when the stud is in the position so that the clamping jaws actuated by the cam 123 will be opened as the carrier frame 21 approaches its top position. A coiled spring inside the boss between the closure disk and the flange 152 of the stud urges the latter inwardly. A release control member 158, which is fast on the protruding end of the stud, has working faces 159 and 160 that are at an angle of slightly over ninety degrees (90°) apart.

Figure 5:
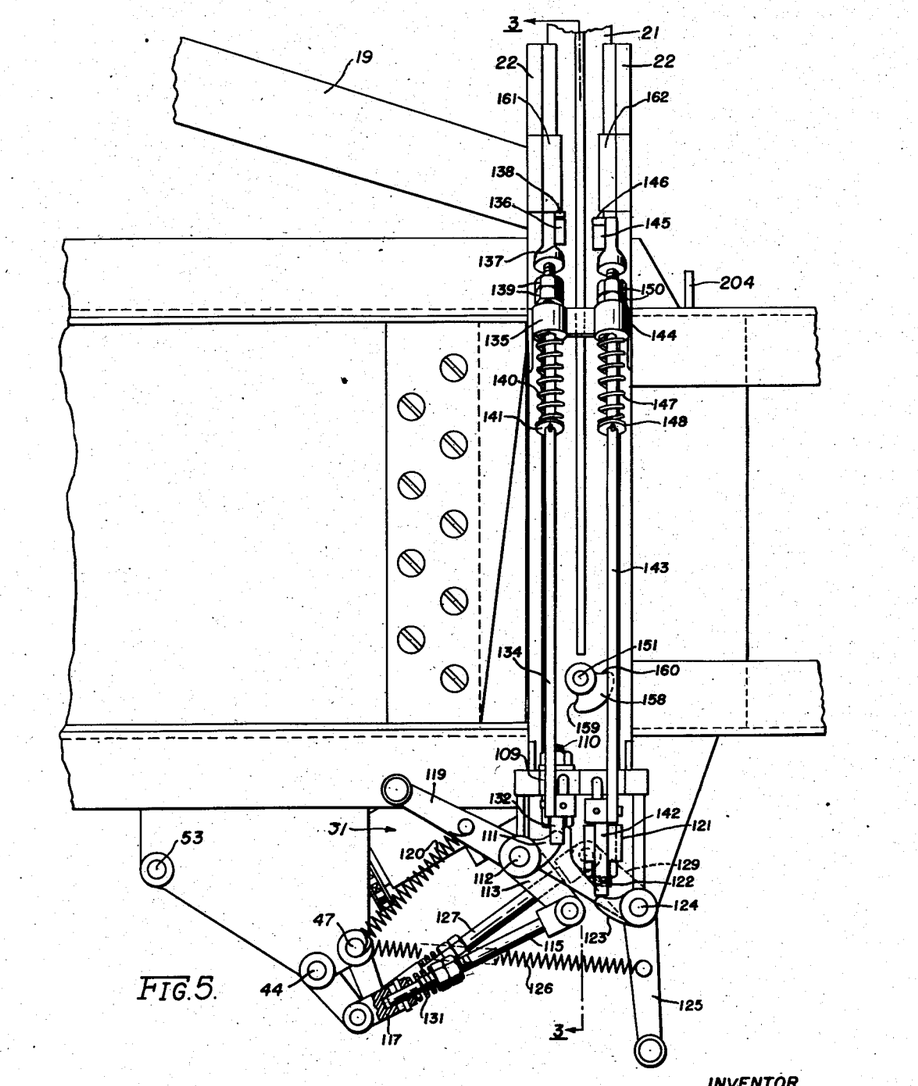
Figure 5 is a vertical side elevation of the clamping jaws operating mechanism at one side of the bale chamber.

With the release control member 158 in the position shown in Figure 5 the face 160 engages the pawl 145 when the carrier frame approaches its top position moving the rod 143 upward and unlatching the cam 123 thus opening the clamping jaws controlled thereby. Cam bosses 161 and 162 are attached to the upper portion of the guides in which the carrier frame moves up and down. Said cam bosses project somewhat toward the center of the guideway so that they can contact the bottom surface of the release control member 158, said contact occurring soon after the release of the cam 123 and accomplishing the function of moving the release control member outward to such an extent that the cross-pin 157 is moved out of the slots 156. In this position the stud 151 and its attached release control member 158 are free to rotate and assuming the member 158 to have originally been in the position shown in Figure 5, said member is rotated slightly more than ninety degrees (90°) clockwise as the carrier frame 21 moves on upward to its extreme position due to the engagement of the pawl 145 with the face 160.

On the next downward motion of the carrier 21 the release control member 158 is in such a position that the pawl 136 is in its way but the pawl is so mounted that it is pushed out of the way and then regains its original position because of the counterweight 137 so that as the carrier returns upward the pawl engages with the face 159 of the release control member 158. This engagement first causes the stud 151 to rotate slightly until the cross-pin 157 drops into the two slots ninety degrees (90°) removed from the ones in which the cross-pin was first assumed to be positioned thus rendering the member 158 immovable during the interval it acts on the pawl 136 to release the cam 111. Subsequent to this operation the cross-pin 157 is again disengaged from the slots by the action of the cam bosses 161 and 162 and is rotated in a counterclockwise direction by the pawl 136 in a manner similar to that already outlined for the clockwise motion. The release mechanism just described thus alternately opens the clamping jaws controlled by cam 111 and the ones controlled by the cam 123 as the carrier frame 21 approaches its top position in succeeding cycles.

Figure 21:
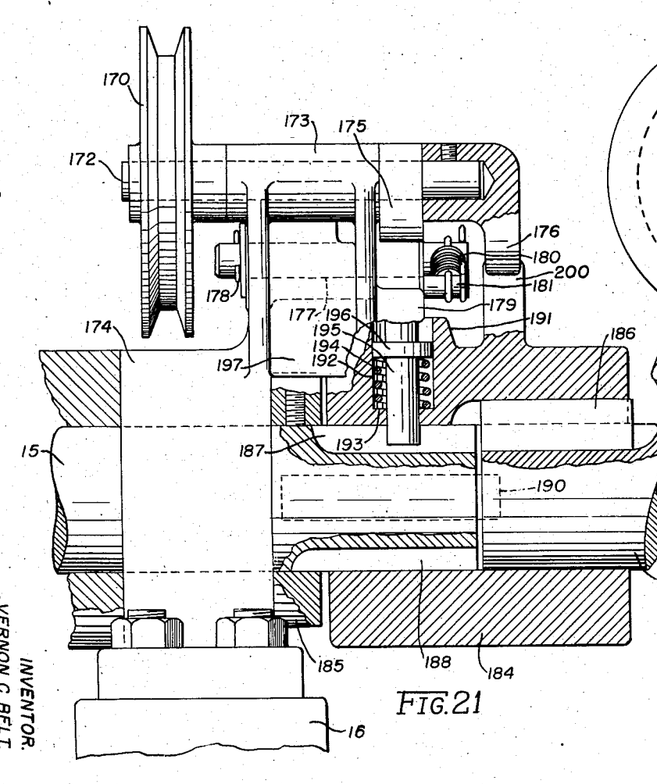
Figure 21 is a vertical section on the plane of line 21—21 of Figure 1 looking to the left in the direction of the arrows and drawn to an enlarged scale to show details of the structure.
Figure 22:
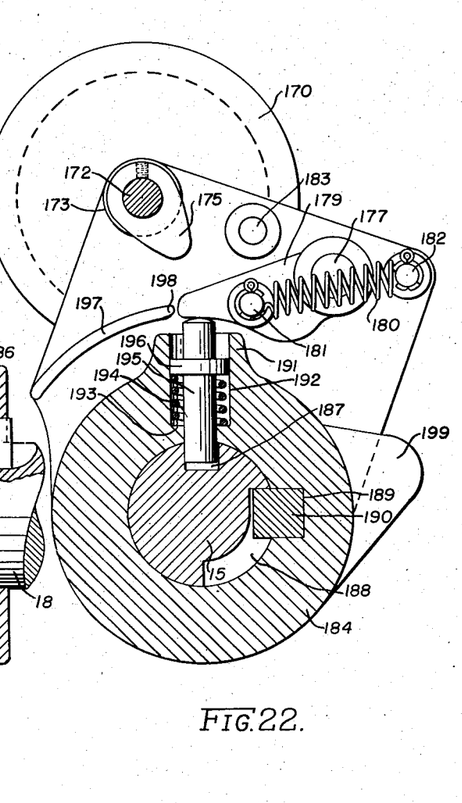
Figure 22 is a vertical section on the plane of line 22—22 of Figure 1 looking outwardly in the direction of the arrows and drawn to an enlarged scale to disclose details of the structure.

The baling chamber extension has a hinged top 163, and mounted thereon, remote to the vertical plane of the carrier 21, is a transverse horizontal shaft 164 that is journaled in bearings 165 arising from the outer portion of the hinged top, and intermediate these bearings there is a spur-wheel 166 that is of sufficient diameter that its lower segment will move in a longitudinally extending opening 167 in the adjacent portion of the hinged top 163 so that the spurs on said wheel are adapted to be engaged by the upper portion of the finished bale while the latter is being pushed through the baling chamber extension during the forming of the next succeeding bale in the baling chamber. The finished bale is identified in Figure 2 as X and the discharging bale as Y. The top 163, at its end remote to the hinge, is held closed by suitable spring tensioning devices 168 which tend to force the top down against the bale X. One end of the shaft 164 extends beyond its bearing where it is provided with a pulley 169 that is connected with and is adapted to drive a pulley 170 through the medium of a suitable belt 171 as shown in Figures 1 and 2. The pulley 170 is a portion of the clutch mechanism 17 hereinbefore referred to that provides, at the proper time, a positive connection between the shafts 15 and 16 that are mounted upon the bridge 16 on the top of the apparatus remote to the discharge end thereof. The details of this clutch mechanism are illustrated in Figures 21 and 22.

The pulley 170 is secured to a short spindle 172 that is journaled in a bearing boss 173 above the bearing 174 of the shaft 15 and the end of the spindle opposite said pulley projects beyond the bearing where it has a cam 175 pinned to it close to the edge of the bearing, and at the extremity of the spindle 172 there is a lug 176 that is secured to said spindle so that it rotates therewith and with the cam 175. Also journaled in the casting of which bearings 174 and 173 are a part is a rotatable rock spindle 177 disposed with its axis parallel with spindle 172 to one side thereof and maintained in its bearing by a cotter 178 and washer at its end adjacent the pulley 170. The other end of the rock spindle 177 has a rocker-arm 179 fastened to it that is in line vertically with cam 175 and a tensed spring 180 extending between a pin 181 on rocker-arm 179 and a pin 182 on the casting is adapted to hold the rocker-arm in either an upper or a lower position dependent upon whether the pin 181 is above or below the horizontal axial plane of the rock-spindle 177, the upward movement of the rocker-arm in a clockwise direction being limited by a stop 183 on the casting between rotatable spindle 172 and rock-spindle 177. The shaft 15 to which the oscillatory arm 14 is secured projects through bearings 174 and half-way into the central axial bore of the cylindrical clutch housing 184, and between the adjacent faces of the bearing and clutch housing said shaft has an annular collar 185 secured to it which holds the shaft in place against longitudinal movement. The other rock-shaft 18 has its adjacent end disposed in the bore of the clutch housing 184 in axial alignment with shaft 15 and it is secured to said housing by a key 186 whereby the shaft 18 and clutch-housing 184 move with each other. The portion of the shaft 15 within the clutch housing has a relatively narrow slot 187 in its upper surface, and there is a relatively wide channel 188 in the lower portion of its surface that extends, from immediately below the slot 187, slightly more than one-fourth around the shaft towards the slot. Opposite the channel 188 there is a key-way 189 in the clutch housing in which a key block 190 is tightly fitted in a manner so that a longitudinal portion of said key will project into the channel 188 of the shaft 15 as shown in Figure 22, which permits relative but limited rotative movement of the parts with respect to each other as well as simultaneous movement of said parts.

The upper segment of the clutch-housing 184 is formed with an outwardly extending embossment 191 that has a radial bore 192 with a reduced inner portion to provide a shoulder or seat 193 for a light expansion spring 194 that surrounds the control pin 195 back of an annular flange 196 on the latter. The flange fits the wider portion of the bore 192 while the inner portion of the pin passes through the reduced bore back of shoulder 193 and is adapted to cooperate with the slot 187 in the adjacent portion of the shaft 15. The axis of the pin aligns with the vertical center-line of the rocker-arm 179 and is below the outer end of said arm as shown in Figures 21 and 22. In the inoperative position of the clutch mechanism the spring 194 urges the control pin 195 in an outward direction so that it is disengaged from the slot 187 of the rock-shaft 15. The adjacent face of the bearing casting below the cam 175 has an arcuate flange 197 projecting horizontally from it in line with the path of the control pin 195 and beyond the free end of the rocker-arm 179, the curve of said flange being concentric with the axes of the shafts 15 and 18. This permits the outer end of the control pin 195 to ride on the concave surface of the flange 197 when the clutch housing 184 is rotated, with the inner end of said pin engaged in the slot 187 of shaft 15. The outer end of the pin is rounded and the leading transverse edge 198 of the flange is suitably shaped to insure a full retraction of the pin into the slot 187 in the event it is only partially retracted before the motion of the clutch housing takes place.

A lug 199 on the clutch housing is adapted to engage the under surface of the rocker-arm 179 when the housing is rotated counter-clockwise (Figure 22) thereby lifting the rocker-arm past dead-center to contact the stop 183. Another lug 200, also on clutch-housing 184, is positioned so that it will engage the lug 176 on the end of the pulley spindle 172. The position of the lug 176 with relation to the cam 175, and the position of the lug 200 with relation to the lug 199, are such that, in the event cam 175 is in the path of the upward motion of the rocker-arm 179, the lug 200 will engage the lug 176 and thus move the cam 175 out of the way before the lug 199 has pushed the rocker-arm 179 upwardly far enough so that the cam would interfere. Normally, lug 200 does not come into engagement with the lug 176 since, between the time the cam 175 has tripped the clutch and the time the rocker-arm 179 is raised by the lug 199, a new charge of the material being baled has been compressed in the bale chamber so that the cam 175 has been moved out of the way due to the motion of the compressed material in the bale chamber. The lugs 176 and 200 have been provided in order to insure that the cam 175 is positively moved out of the way in the event there may be only a light or partial charge of material, or no charge at all, in front of the baling plunger 1 during the stroke when the tying operation is being performed. Should these contingencies arise, cam 175 is moved out of the way and pulley 170 rotates so that either the belt 171 slips slightly or the spur wheel 166 may rotate a short distance in a reverse direction.

The trip-clutch mechanism 17 just described is actuated by the motion of the cam 175 said motion being transmitted to the cam through the belt 171 from the spur wheel 166 and caused by the engagement of the spur wheel with the baled material moving out of the baling chamber. At a point in every revolution of the cam 175, said cam pushes the rocker-arm 179 downward so that the tensed spring 180 makes the rocker-arm exert a force on the top of the control pin 195. The next time the slot 187 in the rock-shaft 15 comes in alignment with the control pin 195, the force caused by the tensed spring 180 exerted on the top of said pin overcomes the light expansion spring 194 and pushes the control pin into the slot thus locking the rock-shaft 15 and the rock-shaft 18 together (position shown in Figures 21 and 22). This causes the arm 19 and the attached carrier frame to move downward during the ensuing counter-clockwise rotation of rock-shaft 15 (as viewed in Figure 22). As the rock-shaft 15 rocks back in a clockwise direction the locking medium between shafts 15 and 18 shifts from the control pin 195 to the key block 190 leaving the pin free to move upward due to the action of the spring 194 after it has passed the edge 198 of the flange 197 thus unlocking the trip-clutch until the cam 175 again comes around and pushes down the rocker-arm 179. Different lengths of bales can easily be made by simply changing the ratios of the pulley 169 and 170 thus changing the length of bale necessary to give the cam 175 a complete revolution.

The wires which are tied about the baled material are fed from supply reels 201 that are journaled on a horizontal shaft 202 supported by suitable brackets attached to and upstanding from the top of the frame "A," there being two of such reels 201 shown, in this instance, for a corresponding number of tying devices 31. The wires "C" pass through tapered guides 203 in line with the threaders 24 so that the wires will pass into the bale chamber through the upper slots 29 through which the threaders pass when moved down to the tying units below the chamber through the lower holes 28 which are so shaped that the cutters will clear the margins of said holes when the tying units 31 are rotated.

It is to be noted that two vertical pins 204 are anchored to the frame "A" proximate to and in line with each of the reels 201 said pins being used in one method of initially threading the machine as will appear more fully hereinafter in a summary description of operations:

Briefly stated, the operation of the instrumentalities described herein may be summarized as follows:

(1) The reels 201 are supplied with continuous length of wire "C."

(2) Take loose end of wire "C" on each reel 201 and tie around the threading pin 204 provided for each reel on the frame "A" (at this time the threader 24 must be above the bale chamber "B" and in its uppermost position).

(3) After the release control member 158 is set properly and the trip clutch is set so that the carrier frame will be set in motion immediately, the machine is started and the threaders 24 move down through the bale chamber and the slots 2 in piston 1 delivering the wires "C" to the two tying units 31 in a manner such that each of the wires "C" is between stationary jaw 59 and movable jaw 57 of a tying unit 31 when the threader reaches its lowest position. The wire "C" is then clamped in the jaws 57—59 of the tying unit 31, the movement and steps being as follows:

(a) The threaders 24 move through the bale chamber "B"

(b) Then along the slots 2 in piston 1

(c) Thereafter to the tying units 31.

(d) Threaders 24 put wire "C" in between stationary 59 and movable jaw 57 of the tying unit 31 as this movement proceeds.

(e) Wire "C" clamped in one set of jaws 57—59 of tying unit 31.

(4) Threader 24 recedes away from the tying unit after the operations outlined in (3) have been executed.

(5) Then the tying unit 31 revolves 2½ times (threader 24 has sufficiently receded by this time to permit this rotation).

(6) After 2½ revolutions of the tying units 31, the cutters 69—70 are moved away back from the bale chambers "B."

(7) One of the cutters 69 shears the wire that has just been delivered, leaving the end of the wire "C" that comes from the reel 201, in clamp of the jaws 57—59.

(8) The cutters 69—70 are then moved on back away from the bale chamber "B."

(9) The severed end of the wire "C" is part of that wire which extends up through the baling chamber "B" to the pin 204.

(10) After the machine is once threaded, the severed end of the wire set forth in operation 9 is removed by hand.

(11) Now wire from the reel 201 is firmly clamped and the hay or other material is fed to the baling chamber "B" and intermittently pushed forward by the piston 1 causing wires "C" to thread three sides of the baled material that is progressively compressed and decreased in size to a predetermined amount.

(12) Then the tripping mechanism 17 is operated again and pushes wire down through the baling chamber "B" and slots 2 of the piston 1 as before. See operations in (3).

(13) This time the baling wire "C" enters the other set of jaws (movable jaw 65 and its coacting stationary jaw) of the tying unit 31 and is clamped therein in a manner similar to that in (3). Figure 10 shows the tying unit 31 in essentially the condition as stated here with the wire "C" entering the movable jaw 65 and with the end of the wire "C" clamped in the opposite set of jaws (the end of the wire "C" is shown dotted because jaw 57 is shown in the open position instead of the closed position).

(14) After threader 24 has receded enough to again allow 2½ revolutions of the tying unit 31, this motion completes the tie around the bale that has been formed (one end is brought down before starting to form the bale, and the other end is the one just brought down and clamped in the other jaw of the tying unit 31).

(15) During the twisting operation, the wire extending up through the baling chamber "B" and out to the reels 201 is wound up around the outside of the cutters for 2½ turns simultaneously with the inside twisting.

(16) After both the outside and inside twisting of the wires takes place in the same operation, the cutters are moved back or away from the bale chamber as before, this action causing the wire that just was brought down to be sheared the same as effective for the shearing operation 7, except that the opposite cutter does this rather than the first cutter involved in operation 7. The cutters continue to move away from the bale chamber until they are completely in the head 34 or outer mechanism of the tying unit 31.

(17) This allows the 2½ turns of wire formerly on outside of cutters to uncoil as the next bale is formed with the end of the wire still firmly clamped between the movable jaw 65 and its coacting stationary jaw.

(18) However, before the next bale is allowed to form, the opposite jaw 57 is opened to release the wire constituting the end of the twisted bale loop, this completing the bale which is moved out of the bale chamber by displacement occasioned by the succeeding bale being formed therein.

(19) The only thing remaining to get the tying unit ready for the repeat cycle, is to move the cutters 69—70 back toward the bale chamber and such motion causes the cutters to be extended to initial position.

(20) The threading can also be completely accomplished by hand. The wires from the reels 201 are threaded through the bale chamber into the open jaw of the tying units. The proper hand crank (either 119 or 125) is operated to clamp the wire within the jaws.

With the arrangement of parts above described and from the summary description of operation, it will appear that a comparatively simple, more effective, and highly advantageous method of and apparatus for baling and tying materials has been provided wherein the continuous baling wires are supplied from reels and the tying effected without manual intervention, except for initial threading and the maintenance of continuous wire wound reels which supplies the machine made bale tying wires in timed relation with the operating of the baling instrumentalities.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In a device for automatically tying bands of wire around bales of material under compression within a bale chamber provided with a plunger movable in the path thereof, the combination with a threader mounted for movement transversely across the bale chamber, of a rotatably mounted tying unit positioned in close proximity to the bale chamber within the path of said threader, said tying unit comprising means cooperating with said threader for clamping a continuous wire at proximate portions thereof, means to effect rotation of said tying unit for twisting said clamped proximate wire portions, said clamping means including a shearing edge for severing the twisted wire portion from said continuous wire, and means cooperating with the shearing edge of said clamping means to sever the twisted wire portions from said continuous wire.

2. In a device for automatically tying bands of wire around bales of material under compression within a bale chamber provided with a plunger movable in the path thereof, the combination with a threader mounted for movement transversely across the bale chamber, of a rotatably mounted tying unit positioned in close proximity to the bale chamber within the path of said threader, said tying unit comprising confronting spaced pairs of stationary and movable jaws cooperating with said threader for clamping a continuous wire at proximate portions thereof, means to effect rotation of said tying unit for twisting said clamped proximate wire portions, separate means adjacent each of said spaced pairs of stationary and movable jaws for shearing said twisted wire portions from said continuous wire, and means for withdrawing said threader from the path of said tying unit prior to operating said twisting and shearing means.

3. A baling apparatus embodying a baling chamber, means for compressing and moving material through said chamber; threading devices movable transversely through said chamber to dispose a wire across said chamber about the bale; and means for tying the wire, said means embodying a rotatable head; spaced clamps thereon adapted to grip proximate portions of the wire; cutters between said clamps for severing the wire; and means for rotating said head while said clamps are in active relation to the wire whereby the proximate portions of the wire are twisted together.

4. A baling apparatus embodying a baling chamber; means for compressing and moving material through said chamber; threading devices movable transversely through said chamber to dispose a wire across said chamber about the bale; and means for tying the wire, said means embodying a rotatable head; spaced clamps thereon adapted to grip proximate portions of the wire; means for opening and closing said clamps; cutters between said clamps for severing the wire; means for operating said cutters; means for rotating said head while said clamps are in active relation to the wire whereby the proximate portions of the wire are twisted together; and devices operatively connecting said head rotating means and said threading devices, whereby movement of said threading devices is transmitted to the head rotating means.

5. A baling apparatus embodying a baling chamber wherein material is compressed and moved; a carrier movable transverse to said chamber; a threader on said carrier adapted to move through said chamber to dispose a wire across said chamber about the bale; a rotatable head adjacent the work end of said threader when the latter is at the lower limit of its movement; spaced clamps supported by said head and bodily rotatable therewith, said clamps adapted to grip proximate portions of the wire lead thereto by said threader; means for rotating said head while said clamps are in active relation to the wire whereby the proximate portions of the wire are twisted together; cutters carried by said head between said clamps, said cutters being inactive during rotation of said head; and devices for actuating said cutters subsequent to the twisting of the wire.

6. In a baling apparatus, tying devices for securing a wire about the baled material, said devices comprising a rotatable body provided with a longitudinal bore; a plurality of bars rotatable with said body and movable longitudinally in said bore; wire-severing members actuated by the longitudinal movement of one of said bars; wire-clamps disposed upon opposite sides of said wire-severing members and actuated by the longitudinal movements of the other bars; and separate means adapted to longitudinally move said bars independently of each other in said bore.

7. In a baling apparatus, tying devices for securing a wire about the baled material; said devices comprising a rotatable body provided with a longitudinal bore; a hollow head projecting from an end of said body; a plurality of bars rotatable with said body and movable longitudinally in said bore; wire-severing members protruding from said head and actuated by the longitudinal movement of one of said bars; wire-clamps disposed upon opposite sides of said wire-severing members and actuated by the longitudinal movements of the other bars; and separate means adapted to longitudinally move said bars independently of each other in said bore.

8. In a baling apparatus, tying devices for securing a wire about the baled material; said devices comprising a rotatable body provided with a longitudinal bore; a hollow head projecting from an end of said body; a plurality of bars rotatable with said body and movable longitudinally in said bore; wire-severing members protruding from said head and actuated by the longitudinal movement of one of said bars; wire-clamps disposed upon opposite sides of said wire-severing members and actuated by the longitudinal movements of the other bars; separate means adapted to longitudinally move said bars independently of each other in said bore; a reciprocable threader device movable toward and from said wire-clamps; and motion transmission devices operatively connecting said threader device and said body whereby a movement of said device is adapted to rotate said body and its associated elements.

9. In a baling apparatus, a tying mechanism for securing a wire about the bale material, said tying mechanism comprising a rotatable body having a head projecting from an end thereof, confronting spaced pairs of jaws mounted on said head, wire severing means on said head to cooperate with said jaws, independent actuator means associated with said rotatable body to operate each pair of jaws and said wire severing means, means for rotating said tying mechanism, and means for operating said actuator means in timed relation with said rotating means to cause said confronting pairs of jaws to grasp said wire before and after enveloping a bale of material, rotating said tying mechanism to twist together the wire ends held in said confronting jaws, and then operating said severing means to cut the wire beyond the twisted portions thereof.

10. In a baling apparatus, a tying mechanism for securing a wire about the baled material, said tying mechanism comprising a rotatable body having a head projecting from an end thereof, confronting spaced pairs of jaws mounted on said head, each pair of confronting jaws serving as a shearing edge, wire severing means on said head to cooperate with the shearing edge of each pair of said jaws, independent actuator means associated with said rotatable body to operate each pair of jaws and said wire severing means, means for rotating said tying mechanism, and means for operating said actuator means in timed relation with said rotating means to cause said confronting pairs of jaws to grasp said wire before and after enveloping a bale of material, rotating said tying mechanism to twist together the wire ends held in said confronting jaws, and then operating said severing means to cut the wire beyond the twisted portions thereof.

11. In a baling apparatus, a tying mechanism for securing a wire about the baled material, said tying mechanism comprising a rotatable body having a head projecting from an end thereof, confronting spaced pairs of jaws mounted on said head, each pair of confronting jaws serving as a shearing edge, a movable wire severing blade adjacent each pair of confronting gears on said head to cooperate with the shearing edge of each pair of said jaws, independent actuator means associated with said rotatable body to operate each pair of jaws and said wire severing means, means for rotating said tying mechanism, and means for operating said actuator means in timed relation with said rotating means to cause said confronting pairs of jaws to grasp said wire before and after enveloping a bale of material, rotating said tying mechanism to twist together the wire ends held in said confronting jaws, and then operating said severing means to cut the wire beyond the twisted portions thereof.

12. In a baling apparatus, a tying mechanism for securing a wire about the baled material, said tying mechanism comprising a rotatable body having a head projecting from an end thereof, confronting spaced pairs of jaws mounted on said head, separate wire severing means on said head to cooperate with each pair of said jaws, independent actuator means associated with said rotatable body to operate each pair of jaws and said wire severing means, means for rotating said tying mechanism, and means for operating said actuator means in timed relation with said rotating means to cause said confronting pairs of jaws to grasp said wire before and after enveloping a bale of material, rotating said tying mechanism to twist together the wire ends held in said confronting jaws, and then operating said severing means to cut the wire beyond the twisted portions thereof.

13. In a baling apparatus, a tying mechanism for securing a wire about the baled material, said tying mechanism comprising a rotatable body having a head projecting from an end thereof, confronting spaced pairs of jaws mounted on said head, separate wire severing means on said head to cooperate with each pair of said jaws, independent actuator bars longitudinally extending through said rotatable body to operate each pair of jaws and said wire severing means, means for rotating said tying mechanism, and means for operating said actuator bars in timed relation with said rotating means to cause said confronting pairs of jaws to grasp said wire before and after enveloping a bale of material, rotating said tying mechanism to twist together the wire ends held in said confronting jaws, and then operating said severing means to cut the wire beyond the twisted portions thereof.

VERNON C. BELT.